United States Patent
Tunik et al.

(10) Patent No.: US 9,015,677 B2
(45) Date of Patent: Apr. 21, 2015

(54) SYSTEM AND METHOD FOR DEVELOPING AND TESTING LOGIC IN A MOCK-UP ENVIRONMENT

(75) Inventors: Ariel Tunik, Binyamina (IL); Dan Eylon, Ramat Hasharon (IL)

(73) Assignee: Nice Systems Ltd., Ra'anana (IL)

( * ) Notice: Subject to any disclaimer, the term of this patent is extended or adjusted under 35 U.S.C. 154(b) by 477 days.

(21) Appl. No.: 13/311,894

(22) Filed: Dec. 6, 2011

(65) Prior Publication Data

US 2013/0145351 A1 Jun. 6, 2013

(51) Int. Cl.
*G06F 9/44* (2006.01)

(52) U.S. Cl.
CPC .................... *G06F 9/4443* (2013.01)

(58) Field of Classification Search
None
See application file for complete search history.

(56) References Cited

U.S. PATENT DOCUMENTS

| | | | | |
|---|---|---|---|---|
| 5,911,059 | A * | 6/1999 | Profit, Jr. | 703/23 |
| 6,772,205 | B1 * | 8/2004 | Lavian et al. | 709/223 |
| 7,139,949 | B1 * | 11/2006 | Jennion et al. | 714/726 |
| 8,365,144 | B1 * | 1/2013 | Webb | 717/109 |
| 8,572,591 | B2 * | 10/2013 | Cwalina et al. | 717/147 |
| 2003/0137522 | A1 * | 7/2003 | Kaasila et al. | 345/619 |
| 2008/0256517 | A1 * | 10/2008 | Atkin et al. | 717/124 |
| 2009/0172636 | A1 * | 7/2009 | Griffith et al. | 717/113 |
| 2010/0318974 | A1 * | 12/2010 | Hrastnik et al. | 717/135 |
| 2011/0239194 | A1 * | 9/2011 | Braude | 717/124 |
| 2012/0110511 | A1 * | 5/2012 | Howard | 715/835 |
| 2012/0266131 | A1 * | 10/2012 | Nojiri et al. | 717/107 |
| 2012/0317555 | A1 * | 12/2012 | Aluru et al. | 717/134 |
| 2013/0145278 | A1 * | 6/2013 | Newell et al. | 715/738 |
| 2013/0311830 | A1 * | 11/2013 | Wei | 714/32 |

OTHER PUBLICATIONS

NICE Systems Ltd., NICE InterAct R7.5—Client User Guide. 385A0891-01 Rev. A0. Feb. 2011.
NICE Systems Ltd., NICE InterAct R7.5—Designer User Guide. 385A0890-01 Rev. A0. Mar. 2011.
NICE Systems Ltd., NICE InterAct R7.5—Desktop and Process Monitoring User Guide. 385A0894-01 Rev. A0. Mar. 2011.
NICE Systems Ltd., NICE InterAct R7.5—System Administration Guide. 385A0892-01 Rev. A0. Mar. 2011.
NICE Systems Ltd., NICE Process Optimization 4.8.1—Client User Guide. 385A0891-02 Rev. A0. Aug. 2011.
NICE Systems Ltd., NICE Process Optimization 4.8.1—Designer User Guide. 385A0890-02 Rev. A0. Aug. 2011.
NICE Systems Ltd., NICE Process Optimization 4.8.1—RTAM User Guide. 385A0894-02 Rev. A0. Aug. 2011.
NICE Systems Ltd., NICE Process Optimization 4.8.1—System Administration Guide. 385A0892-02 Rev. A0. Aug. 2011.

(Continued)

*Primary Examiner* — Insun Kang
(74) *Attorney, Agent, or Firm* — Pearl Cohen Zedek Latzer Baratz LLP (57) ABSTRACT

A system and method is provided for generating logic to automate target applications. The logic may be programmed in a virtual environment using mock-up screen elements that mimic the behavior of real screen elements in the target applications environments. The programmed logic may be executed in a computer system using the real screen elements in the target applications environments. The operating environment may be switched between the virtual environment in a mock-up mode and the target applications environment in a real mode.

20 Claims, 8 Drawing Sheets

(56) References Cited

OTHER PUBLICATIONS

OpenSpan Desktop Automation. http://www.openspan.com/products/desktop_automation/ Printed Feb. 20, 2012.

Corizon Enterprise Mashup Solutions for Business—archived on Jul. 8, 2011; printed on Feb. 21, 2012. http://web.archive.org/web/20110708192911/http://www.corizon.com/Enterprise-Mashup-Solutions-for-Business/call-centre.html.

* cited by examiner

SYSTEM AND METHOD FOR DEVELOPING AND TESTING LOGIC IN A MOCK-UP ENVIRONMENT

FIELD OF THE INVENTION

Embodiments of the invention relate to systems and methods for developing and testing logic based on interactions with screen elements in target applications. In particular, embodiments of the invention relate to developing logic in environments in which the target applications are not installed. The logic may be used, for example, to provide agents at call centers with automated support.

BACKGROUND OF THE INVENTION

Company call centers or online support forums put customers in contact with company agents for customer service, for example, to provide technical support, sell products or schedule appointments. Depending on the needs of the customers, agents may be burdened with an excessive amount of tasks. To meet customer expectations for service and efficiency, agents typically handle many tasks simultaneously at an intensive pace. However, when agents rush to complete tasks, they often generate errors, and when agents take the time to carefully complete tasks, they may frustrate customers with longer wait times. Accordingly, agents performing fully manual tasks may fail to meet customer needs.

SUMMARY

Some embodiments of the invention may generate logic to automate target applications. The logic may be programmed in a virtual environment using mock-up screen elements that mimic the behavior of real screen elements in the target applications environments. The programmed logic may be executed in a computer system using the real screen elements in the target applications environments. The operating environment may be switched between the virtual environment in a mock-up mode and the target applications environment in a real mode.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

When used herein, an "interaction" may refer to any user or device communication or connection, such as, between a customer and agent or between their devices. The interaction may occur over any communication channel(s), for example, Internet, Intranet, public network, private network, local area network, wide area network, messaging via text messaging, short message service (SMS) messaging, e-mail messaging, blogs or micro-blogs, radio, and telephone or calling channels.

When used herein, a telephone call or connection may include devices and networks beyond the "plain old telephone system" (POTS), such as voice over Internet protocol (VOIP) telephone calls using personal computers. "Calling" in the context of a person taking action may including using a traditional telephone or other device such as a VOIP telephone, cellular telephone, or other device, to speak with a person. Furthermore, embodiments of the invention may allow for a user to contact an agent via other methods, such as on-line chat. "Calling" in the context of a process or processor taking action may mean, for example, executing a software process, requesting a software process perform some function or return some result, etc.

Embodiments of the invention may provide agents with automated support to improve their performance. Some systems may provide a support plug-in or application, for example, installed at the agent workstation, to monitor the agents' activity. The support module may automatically capture or record screen shots or events at the agent workstation and extract relevant or "important" data therefrom to monitor the agent's activity. Based on the monitored activity, the support module may use logic to automatically run tasks. These tasks, previously executed manually by agents, may be executed automatically by one or more proxy support components, thereby freeing the agent to handle more tasks or tasks more quickly to improve agent and contact center performance and efficiency.

To automate agent tasks, embodiments of the invention may include additional "proxy" elements linked to real application elements by a connectivity layer. Accordingly, when the real element is used by the application to execute its original task, the linked proxy element may likewise be triggered to execute its additional automated task. For example, an agent input or action with respect to or on a real screen element, such as, the manipulation of a graphical user interface (GUI) element by clicking (e.g. using a pointing device such as a mouse) a button (e.g., an on-screen button shown on a monitor or display), entering customer data into a data field (e.g., using a keyboard), entering a billing code, etc., may trigger one or more automated tasks, such as, executing or running a program, copying text entered into the data field into other field(s), sending a bill to a customer, etc.

The specific automated task(s) of each proxy element and its correlation to real element(s) may be defined by the logic according to the specific needs and target applications in a call center environment. In one example, an agent's workstation may run (N) different target applications with (N) different entry fields that each separately stores the same customer's address as a different address instances. To automate the entry fields, the connectivity layer may link each real address entry field with a proxy entry field. Thus, when an agent updates a single instance of the address in a single real entry field, the linked proxy element(s) may automatically update the addresses into the remaining (N−1) entry fields. In another example, a real purchase button may be linked to a proxy billing application. Thus, when an agent makes a sale, e.g., selecting a purchase button (e.g., using a pointing device or keyboard to manipulate an on-screen icon or button) associated with a product or service listed in a product field, the proxy element may automatically start a billing task to create or update a bill with the billing information for the product or service listed in the product field and/or send an updated bill to the customer. These examples list some possible automated tasks of which there are innumerably many others. The specific correlations between agent actions (instantiated or executed using real screen elements displayed on monitors or displays) and automated tasks (instantiated or executed using proxy screen elements) may be programmed, added to or inserted into the logic during a development stage.

In the development or programming stage, a developer or programmer may determine the correlation logic, for example, based on their knowledge of the interaction center or the agents' target applications. Alternatively or additionally, all or some of these correlations may be determined (fully or partially) by an automatic computer process, for example, which scans application code and defines correlations according to predetermined criteria, for example, linking all common fields, linking purchase fields to billing codes, etc. In yet another embodiment, an optimization algorithm may perform statistical analysis on each option to select the correlation configuration associated with optimal performance. The correlation logic and automated functionality may be fully (or partially) programmed to the proxy element and not the real element (e.g., the code defining the logic may be written to a library loaded to execute the proxy element, not to the code of the target application). To run the real agent's applications with the automated functionality, an application layer may run the target application and load the data library (e.g., a dynamic link library (dll) in a .NET framework) to instantiate or execute the proxy element to execute the support logic for the application.

Applications used by an interaction center are typically generated and sold to the interaction center by a different company or entity and installed off-site (e.g., at the different company's servers, remotely from the interaction center servers). To access the functionality of these applications in order to develop and test their automated support, some systems may install the applications on-site at the interaction center servers, for example, local to a memory storing the logic files. On-site installation of other companies' applications may be expensive for an interaction center (e.g., paying to lease the rights to the application from the application owner) while access to their off-site source servers may be restricted or time consuming.

To obviate the need to access the real application installation package, embodiments of the invention may generate a "mock-up" or copy of interactive elements of the target applications to simulate interacting with real application elements without actually accessing the real target applications themselves. These mock-up application elements may replicate, for example, some or all elements from the real application that may be controlled by users or agents, such as GUI elements, since the support logic may aim to automatically support or supplement such agent control. A mock-up of the real application elements may be a virtual copy of the elements designed for the development stage, for example, in a "mock-up" mode. The mock-up application elements implement interfaces that expose the functionality of the corresponding real application elements, mimicking their behavior. To mimic the agent's applications behavior with the automated functionality in a mock environment, an application layer may load a mock data library to instantiate or execute the mock-up application element to execute the support logic. Since the mock-up application element are not real, they may only log or identify interactions or events without actually executing their functionality on the target (or any) application. The mock-up application element may be executed to test its functionality.

After developing and testing the logic in the mock-up environment, the logic may be tested in the real application environment. For example, the application layer may switch from "mock-up" mode (loading a mock-up library to run mock-up elements) to a "real" mode (loading a real library to run proxy elements). Testing initially in the mock-up mode may verify that the automated functionality performs correctly using the mock-up screen elements, which may reduce testing time in the real mode. In real mode, the application layer may run the actual target applications, e.g., from remote servers, in conjunction with the proxy elements, e.g., from a local server, implemented according to the developed logic. If the real mode test is successful (e.g., having desired functionality or functionality substantially matching the mock-up mode), the logic file may be finalized and implemented in a support package, for example, installed on each agent workstation or at a support center server. However, if the real mode test is unsuccessful, the developers may return to mock-up mode to further adjust the logic in the development stage.

Accordingly, embodiments of the invention may develop support logic to automate agent application(s) in a mock-up or virtual environment, without accessing the actual installation sites of the application(s). Such embodiments may avoid the costs and complications associated with installing each application locally or accessing each application's remote installation site.

Figure 1:
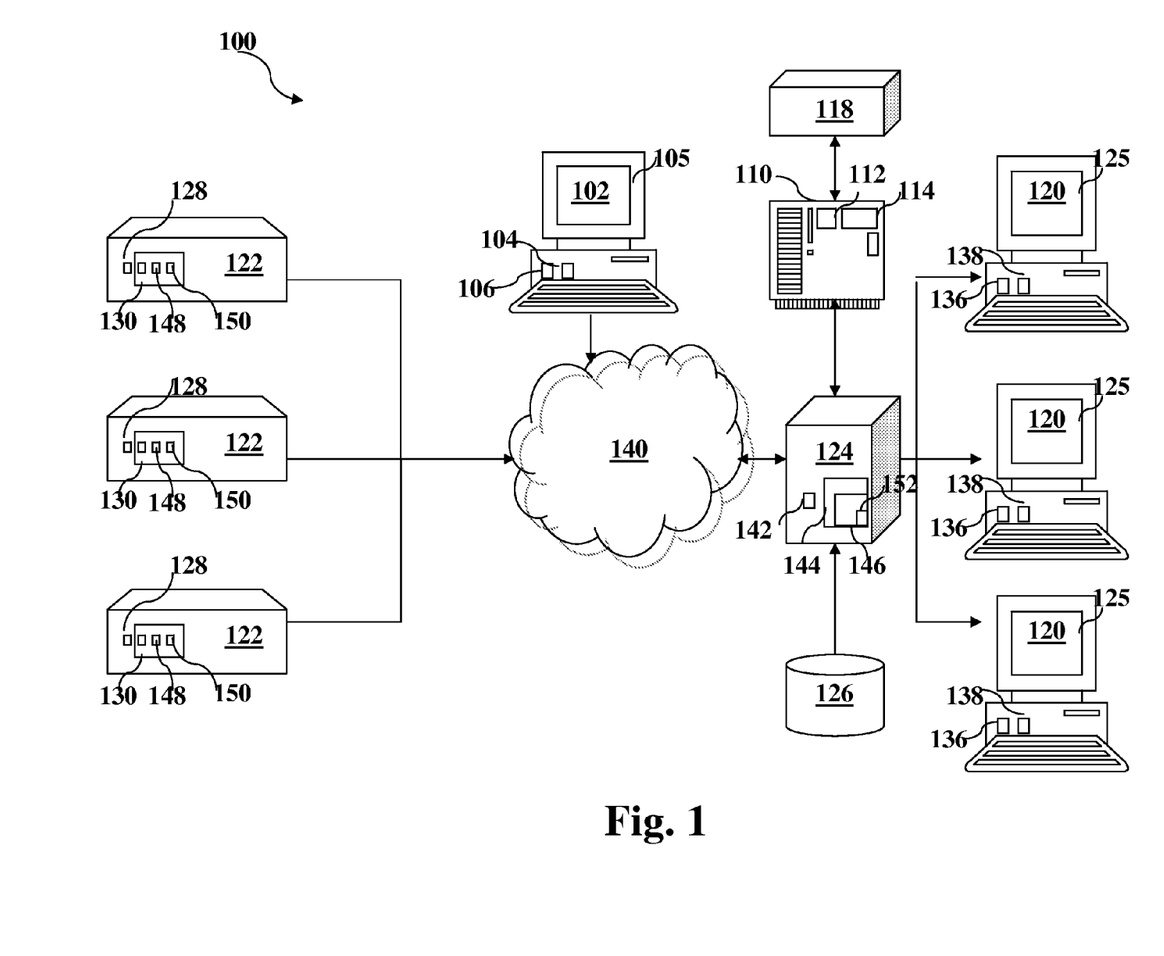
FIG. 1 schematically illustrates a system for programming an application layer using a mock-up or virtual environment mimicking a real application environment according to an embodiment of the invention.

Reference is made to FIG. 1, which schematically illustrates a system 100 for programming an application layer using a mock-up or virtual environment 146 mimicking a real application environment 148 according to an embodiment of the invention. In the example in FIG. 1, application mock-ups are created to provide automated support to agents interacting with customers at an interaction center, although mock-ups may be created for any user to automate any application(s).

System 100 may include one or more user devices 102. Customers may operate user devices 102 to interact over one or more communication channels via one or more networks 140 (e.g. such as the Internet or world wide web, "web"). User devices 102 may include computers (for web or Internet connections), telephones (for telephone or radio network connections), or messaging or text enabled devices (for messaging network connections). Customers may connect via user devices 102 with live (e.g. human) or automated (e.g. computer generated or operated) agents for example operating or being executed by agent devices 120 in an interaction center 124.

Interactions center 124 may include company or operate or execute call centers (for telephone-based support) or online support forums (for Internet-based support) to automatically connect user devices 102 to agent devices 120. Interactions center 124 may include a switching station to order and connect each of a plurality of user devices 102 to one of a plurality of agent devices 120. Interactions center 124 may order customers in a queue, for example, to be served on a first-come first-serve basis. Interactions center 124 may connect each customer's user devices 102 to the next available agent's device 120 from a pool of available agents, for example, to provide the fastest agent response time.

Agent devices 120 may include the same or different device(s) as user devices 102, such as, computers, telephones, cellular devices, and/or messaging devices. Agents operating agent devices 120 may provide users with customer support, conduct transactions for purchasing products or services, fill out surveys, update data records, or provide other products or services. To provide customer support, agent devices 120 may run or execute one or more target applications 150, such as, customer relationship management (CRM) applications, mail applications, web knowledge base applications, enterprise resource planning (ERP) applications, etc. System 100 may include one or more application servers 122 for hosting the one or more target applications 150.

System 100 may include one or more capture servers 110 and/or storage centers 118 for recording and storing agents' interactions with target applications 150. Capture servers 110 may record, copy, or capture events at agent device 120 that occur locally or over network 140, for example, using a passive sniffing device or probe. Capture servers 110 may store the captured data in storage centers 118, for example, as long-term and/or short-term memory.

Interactions center 124 may program (e.g., create code or software for, stored for example, in memory 138) a connectivity layer with logic to interconnect events across multiple target applications 150 from different application servers 122, for example, where an event in one application 150 triggers an event in another application 150. The connection layer may link proxy elements to real application elements, for example, to automate tasks such as data entry, billing, accessing customer information, researching solutions to customer problems, etc. However, in some embodiments, interactions center 124 may desire to develop such logic internally at interactions center 124, without accessing application servers 122.

According to embodiments of the invention, interactions center 124 may create a virtual or mock-up application environment 146 copying the real application environment 148 at application servers 122. Real application environment 148 may include code to operate real application elements according to properties, methods and events defined by the real target applications 150. Real application environment 148 code for each target applications 150 may be stored at a respective application server 122 in a memory unit 130. Mock-up application environment 146 may include code to operate mock-up application elements according to properties, methods and events defined by a mock-up interface to mimic the behavior of the real elements. Mock-up application environment 146 and may be stored at interactions center 124 or agent devices 120 in their respective memories 144 and 138.

Interactions center 124 may use the mock-up application environment 146, e.g., in a mock-up mode, to program or create code for logic 152 to automate target applications 150. Once the program logic 152 development is complete, interactions center 124 may replace mock-up application environment 146 with real application environment 148, e.g., in a real mode, to test, execute and/or apply the functionality of logic 152. Logic 152 (e.g., code, instructions or software) may be stored, e.g., as a logic file or plug-in, stored at interactions center 124 (e.g., in memory unit 144) and/or on each agent device 120 (e.g., in memory 138).

When discussed in this application, agents may include real-life interactive personnel, automated computer agents, avatars, voice or text prompts, etc., or a combination semi-live/semi-automated agent.

User device 102, capture server 110, agent device 120 application server 122 and interaction center 124, may each include one or more controller(s) or processor(s) 106, 112, 136, 128, and 142, respectively, for executing operations and one or more memory unit(s) 104, 114, 138, 130 and 144, respectively, for storing data and/or instructions (e.g., software) executable by a processor. Processor(s) 106, 112, 128, 136 and 142 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 104, 114, 138, 130 and 144 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units. User device 102 and agent device 120 may include one or more input devices, for receiving input from a user or agent (e.g., via a pointing device, click-wheel or mouse, keys, touch screen, recorder/microphone, other input components) and output devices 105 and 125 (e.g., a monitor, display or screen) for displaying data to a customer and agent, respectively.

Capture server 110, storage centers 118, agent device 120, and interactions center 124, may each be or include, for example, software executed on one or more processors, and while this software may be in one processing device or server, it is not necessarily executed by the same processor or within the same computing device.

Figure 2:
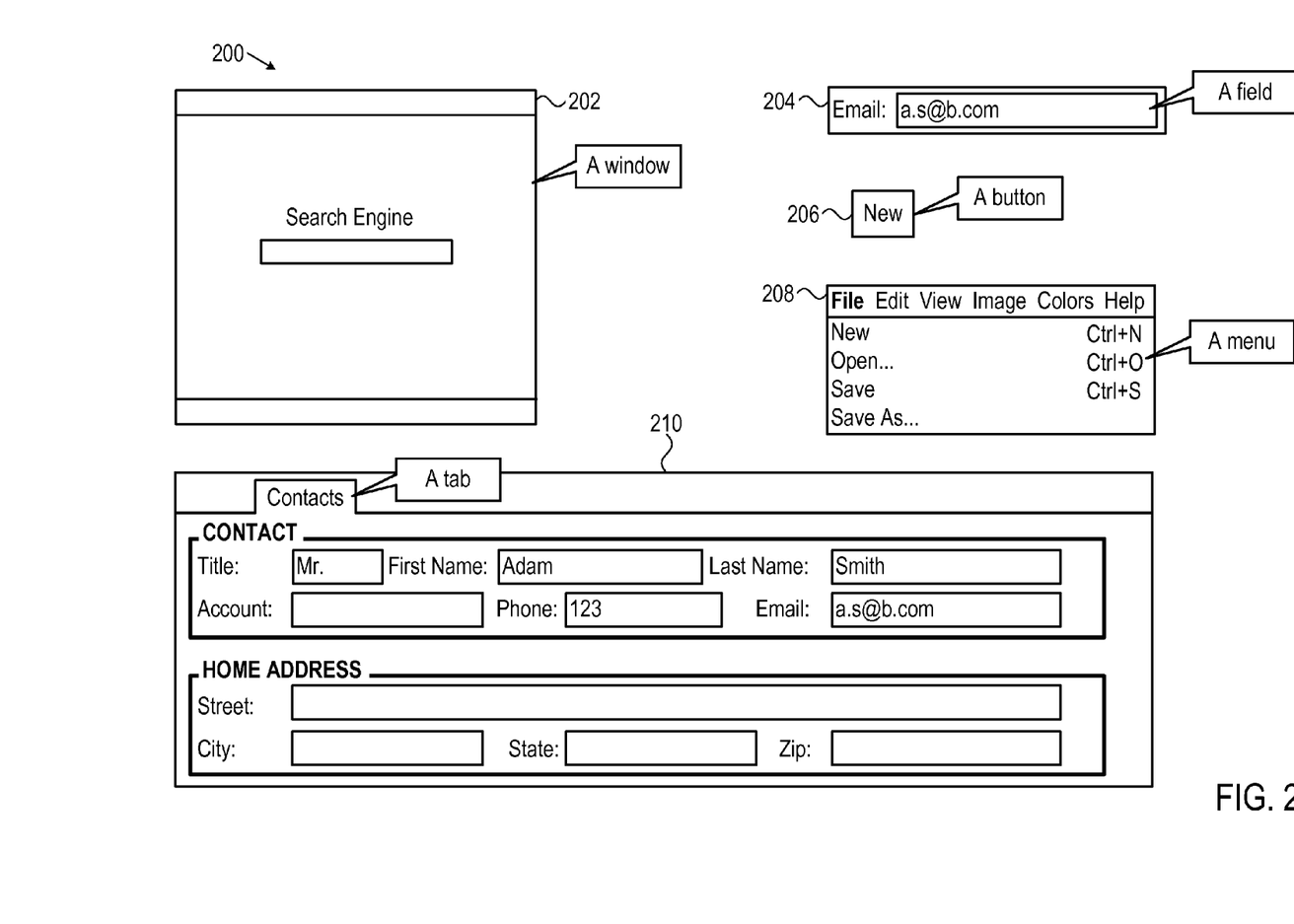
FIG. 2 schematically illustrates examples of screen elements in target application(s) according to an embodiment of the invention.

Reference is made to FIG. 2, which schematically illustrates examples of real screen elements 200 in target application(s) according to an embodiment of the invention. Screen elements 200 may be provided by target application(s) (e.g., target applications 150 of FIG. 1) installed at application servers (e.g., application servers 122 of FIG. 1) and may be displayed on a screen (e.g., output device 125 of FIG. 1) at an agent workstation (e.g., agent device 120 of FIG. 1).

Screen elements 200 may be visual elements displayed on a monitor or display that interact with a user to, for example accept data or information from a user and/or display data or information to a user. Screen elements 200 may include and may be defined by associated code or instructions executed by a processor. For example, a screen element may be considered to be code, instructions or software which controls the display and data received from the visual representation of the screen element. In the example in FIG. 2, screen elements 200 include a window 202, a field 204, a button 206, a menu 208, and a tab 210, although any other application elements may be used. Other screen elements 200 may include, for example, drop selection fields, check boxes, scroll or slide bars, icons, graphs, control buttons on a player such as a shadow browsing player, or any other GUI controls. Shadow browsing may provide the agent with a real-time playback of the customer's screen.

Screen elements 200 may be automated such that events or interactions with screen elements 200 in one target application may trigger the execution of automated tasks, for example, in a different or sub-application. The automated tasks may be defined by a programmer and may vary depending on the system design. Examples of automated tasks may include automating a recurring task, extracting relevant information for agents in call centers, etc. To automate elements 200, several techniques may be used, such as "hooking," to alter or augment the behavior of target operating systems, applications, or other software components by intercepting events at elements 200 or calls or messages passed between software components.

Figure 3:
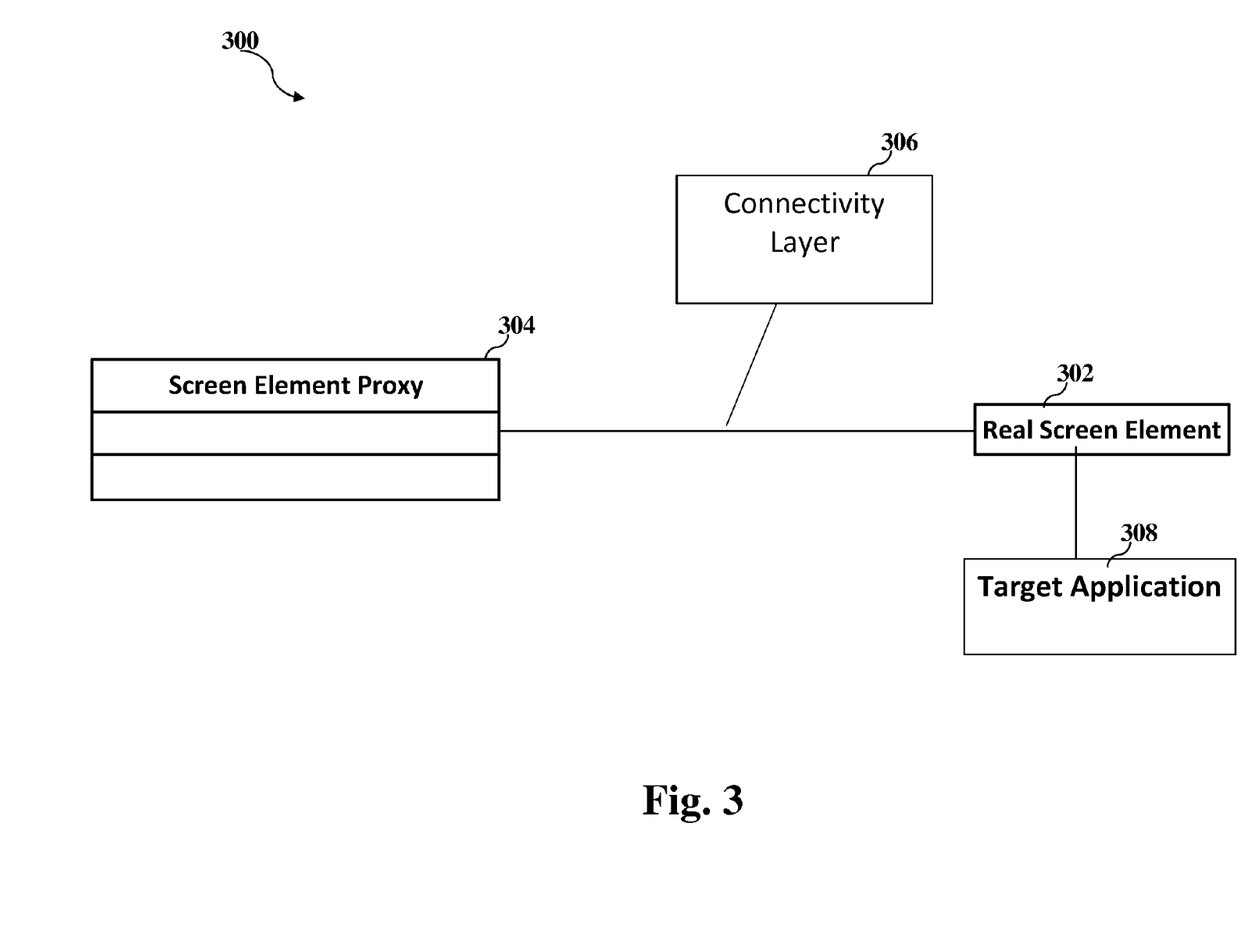
FIG. 3 schematically illustrates an application layer for automating a real screen element according to an embodiment of the invention.

In a real application environment, in addition to the original screen elements 200 that execute an original application task, a secondary automated or proxy screen element (e.g., screen element proxy 304 of FIG. 3) may be used, which is initiated or triggered by the intercepted events to execute a secondary automated or proxy task, for example, as described in reference to FIG. 3. A real mode library may be loaded to run or execute proxy elements.

Figure 4:
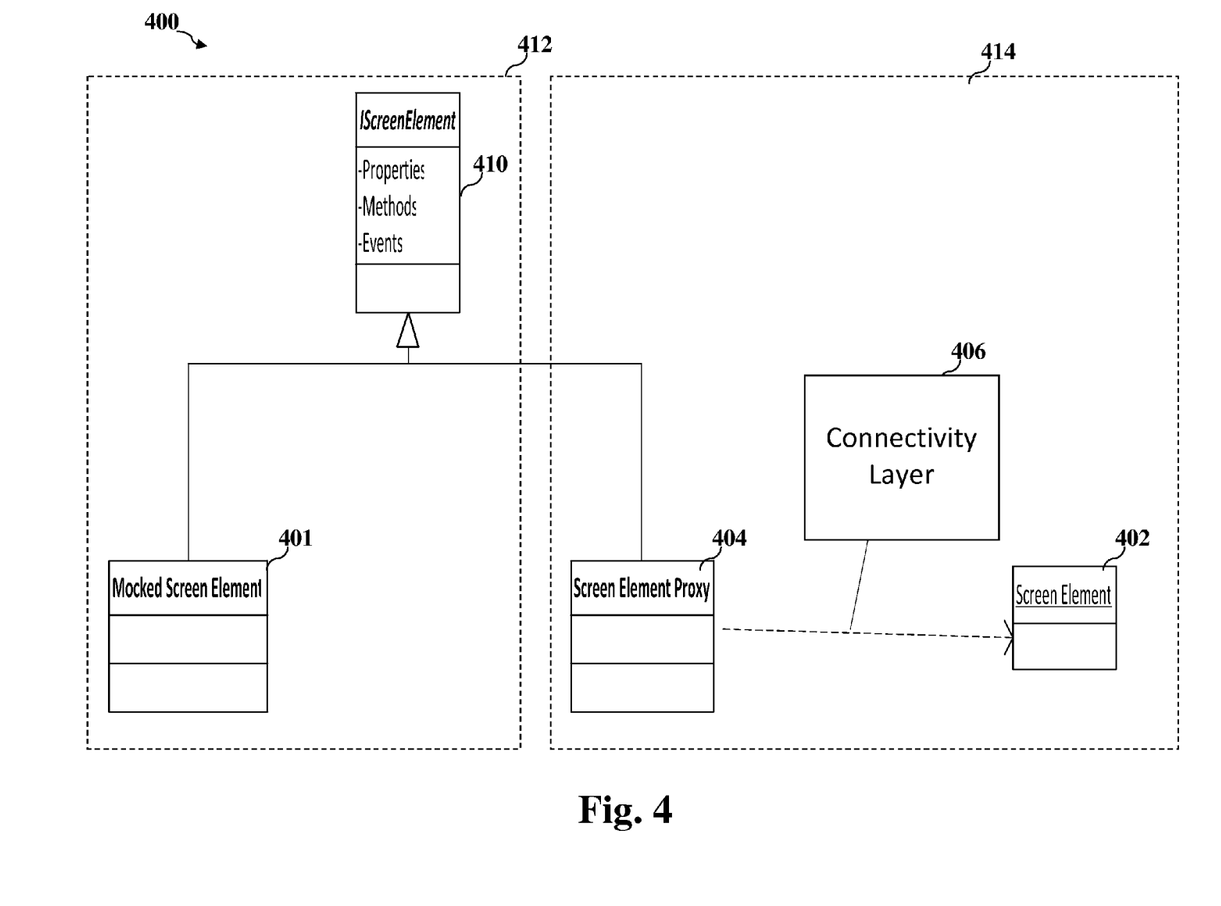
FIG. 4 schematically illustrates an application layer for automating a "mock-up" screen element according to an embodiment of the invention.

In a mock-up application environment, a mock-up element (e.g., mock-up screen element 401 of FIG. 4) may be used, which is triggered by the intercepted events to log or identify (without actually executing) the automated tasks, for example, as described in reference to FIG. 4. A mock-up mode library may be loaded to run mock-up elements.

Reference is made to FIG. 3, which schematically illustrates an application layer 300 for automating a real screen element 302 according to an embodiment of the invention.

Application layer 300 may include one or more real screen element(s) 302 (e.g., screen elements 200 of FIG. 2). Real screen element 302 may be provided by a target application 308 (e.g., target application 150 installed at application server 122 of FIG. 1) and displayed at an agent device or center (e.g., agent device 120 or interactions center 124 of FIG. 1). A user operating the agent device may interact with real screen element 302 to generate interaction events.

To automated real screen element 302, application layer 300 may include additional element(s), e.g. screen element proxy 304. Screen element proxy 304 may be linked to real screen element 302 by a connectivity layer 306, which upon detecting an event at real screen element 302, may trigger an additional automated event using screen element proxy 304. The automated logic of application layer 300 may be built into screen element proxy 304, for example, to separate the real properties, methods and events (e.g., executed by real screen element 302) from the automated properties, methods and events (e.g., executed by screen element proxy 304).

Screen element proxy 304 typically only has meaning with respect to the real screen element 302 to which it connects, e.g., via connectivity layer 306. For example, events at screen element proxy 304 may be delegated to real screen element 302. Accordingly, in order to build, test and execute the logic for automating events at real screen element 302, connectivity layer 306 may connect and run in the real application environment (e.g., real application environment 148 of FIG. 1) to instantiate or execute real screen element 302. However, the real application environments for target applications are often restricted, for example, allowing no access to the developers or by requiring concessions for such access such as a license, monetary fee, or other goods or services. In one example, to develop logic under such restrictions, connectivity layer 306 may be programmed (e.g., code or software may be created for), for example, as follows:

Off-site at the application servers in which target applications 308 are installed.

On-site at a local machine (e.g., interaction center 124 or agent device 120 of FIG. 1) after installing target applications 308 in the machine for a developer to develop the logic. However, these solutions may be expensive and time consuming. For example, off-site installation may accrue costs for sending solution engineers to application server premises, and on-site installation may accrue costs to license target applications 308 for the on-site installation. To overcome these issues, embodiments of the invention may create "mock-ups" or replicas of real screen element 302, which are fully programmable at the development site (without the above restrictions), for example, as described in reference to FIG. 4.

Reference is made to FIG. 4, which schematically illustrates an application layer 400 for automating a "mock-up" screen element 401 according to an embodiment of the invention.

Mock-up screen element 401 (provided in a mock-up application environment 412) may mimic or copy the behavior, functionality and/or graphics of a real screen element 402 (e.g., real screen element 302 of FIG. 3) of a target application (provided in a real application environment 414). Mock-up screen element 401 may implement the properties, methods and events of a mock-up interface 410. Mock-up screen element 401 may allow programmers to use, test and adapt the behavior of target applications (e.g., target applications 150 of FIG. 1) without accessing the actual applications and real screen elements 402 themselves.

Mock-up screen element 401 may execute logic (e.g., logic 152 of FIG. 1) to automate screen elements. By separating automated logic from real screen element 402, such automated logic may be easily switched between real and mock-up environments. To activate the automated logic to interact with mock-up interface 410 to program (e.g. create code for) in "mock-up" mode, the mock-up data library may be loaded to run mock-up screen element 401.

Once the desired automation is implemented in mock-up mode, to switch to a "real" mode, the real data library may be loaded to link screen element proxy 404 to real screen elements 402, for example, via a connectivity layer 406 (e.g., connectivity layer 306 of FIG. 3).

Application layer 400 may enable software logic that when executed automates real screen elements 402 of target applications to be developed and tested using mock-up screen elements 401 in a mock-up environment (e.g., at local agent devices or centers) separate from where the target applications are installed (e.g., at remote applications servers). This separation may enable the logic developers to test the logic they develop isolated from the applications' installation sites to avoid the costs associated those sites. Furthermore, whereas the target application may bundle a sequence of real screen elements 402 to be programmed together at the installations site, application layer 400 may enable the associated mock-up elements 401 to be programmed in any combination. For example, logic may be generated and tested for any single (unit) or multiple screen elements for fast and effective unit testing, for example, regardless of the groupings or relationships defined between the screen elements in the target application code.

Mock-up screen element 401 may be generated manually and/or automatically. Manually generated mock-up screen elements 401 may be generated, for example, by a programmer viewing the application and designing, copying or selecting a substantially similar mock-up screen element 401. Automatically generated mock-up screen elements 401 may be generated, for example, by a computer program reading or scanning the real application to automatically detect and copy real screen elements 402 therein or simplified versions thereof. In one embodiment, mock-up screen elements 401 may be generated manually when the corresponding copied real screen elements 402 are relatively simple, such as, a button, field, tab, etc., and mock-up screen elements 401 may be generated automatically when the corresponding copied real screen elements 402 are new (not pre-generated as a selectable option) or too complex to replicate manually. In other embodiments, any combination of fully manual, fully automated, or semi-manual and semi-automated processes or devices may be used to generate mock-up screen elements 401.

Screen elements (real or mock-up) may include a graphical interface for users to visualize and interact with the elements on a screen and/or code, instructions or software which controls the screen element functionality when a user interacts with the elements, such as, changing the element's appearance in reaction to events, triggering actions or events initiated by input to those elements, etc. Real screen elements 402 may actually execute this functionality, while mock-up screen elements 401 typically log such functionality (without actually executing it).

Figure 5:
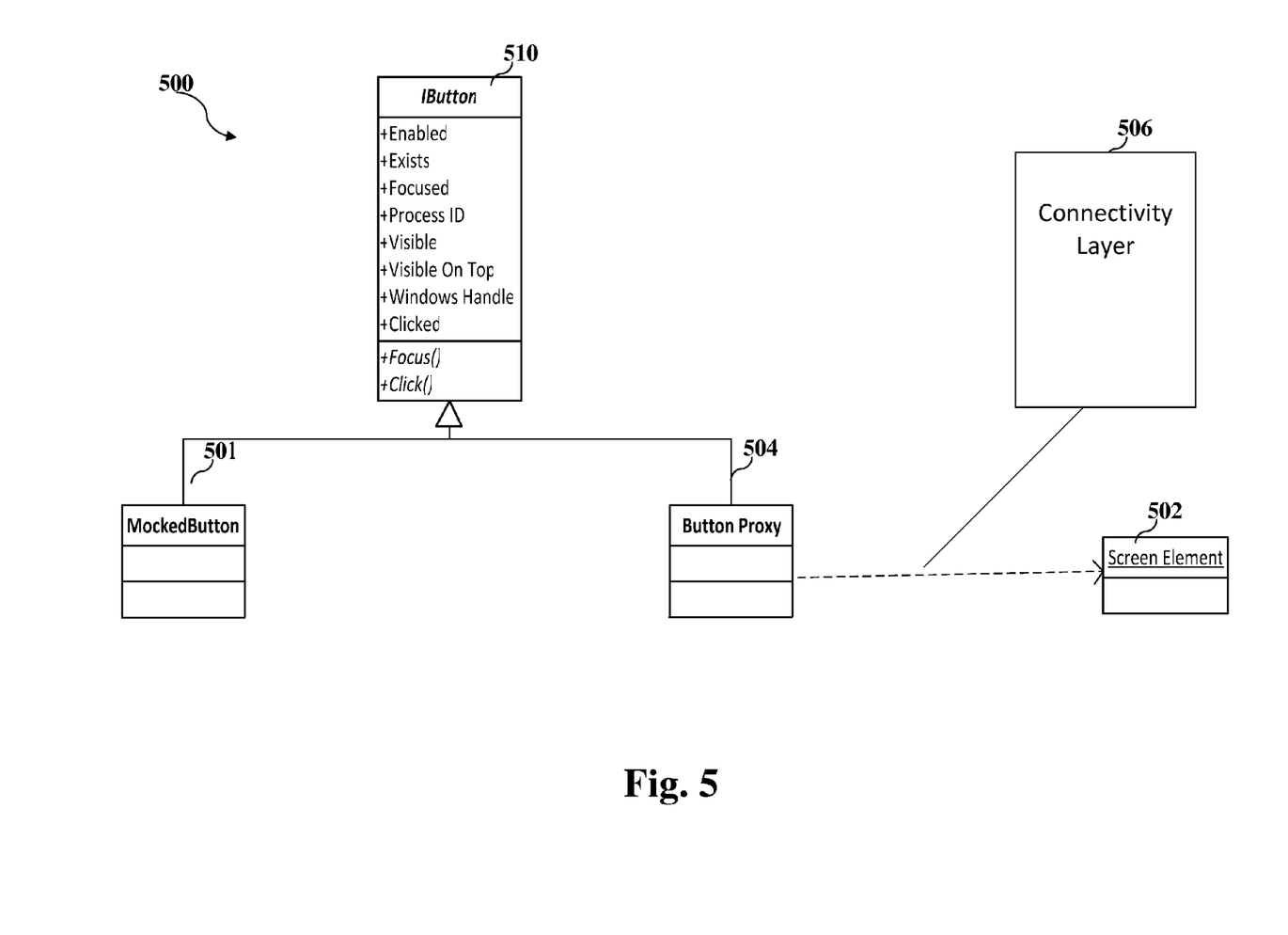
FIG. 5 schematically illustrates an application layer for automating an example mock-up screen element of a button according to an embodiment of the invention.

Reference is made to FIG. 5, which schematically illustrates an application layer 500 for automating an example mock-up screen element of a button 501 according to an embodiment of the invention.

In the example of FIG. 5, button 501 is a mock-up screen element that mimics the behavior of a real button 502 in a target application. A button interface 510 may declare or define the properties, methods and events associated with button 501. In order to interact with a corresponding real button 502, a button proxy 504 is added, which uses a connectivity layer 506 to act as a proxy to real button 502.

Although the mock screen element is a button in the example of FIG. 5, any other screen element may alternatively or additionally be used, such as, a window, a field, a menu, a tab, etc.

Figure 6:
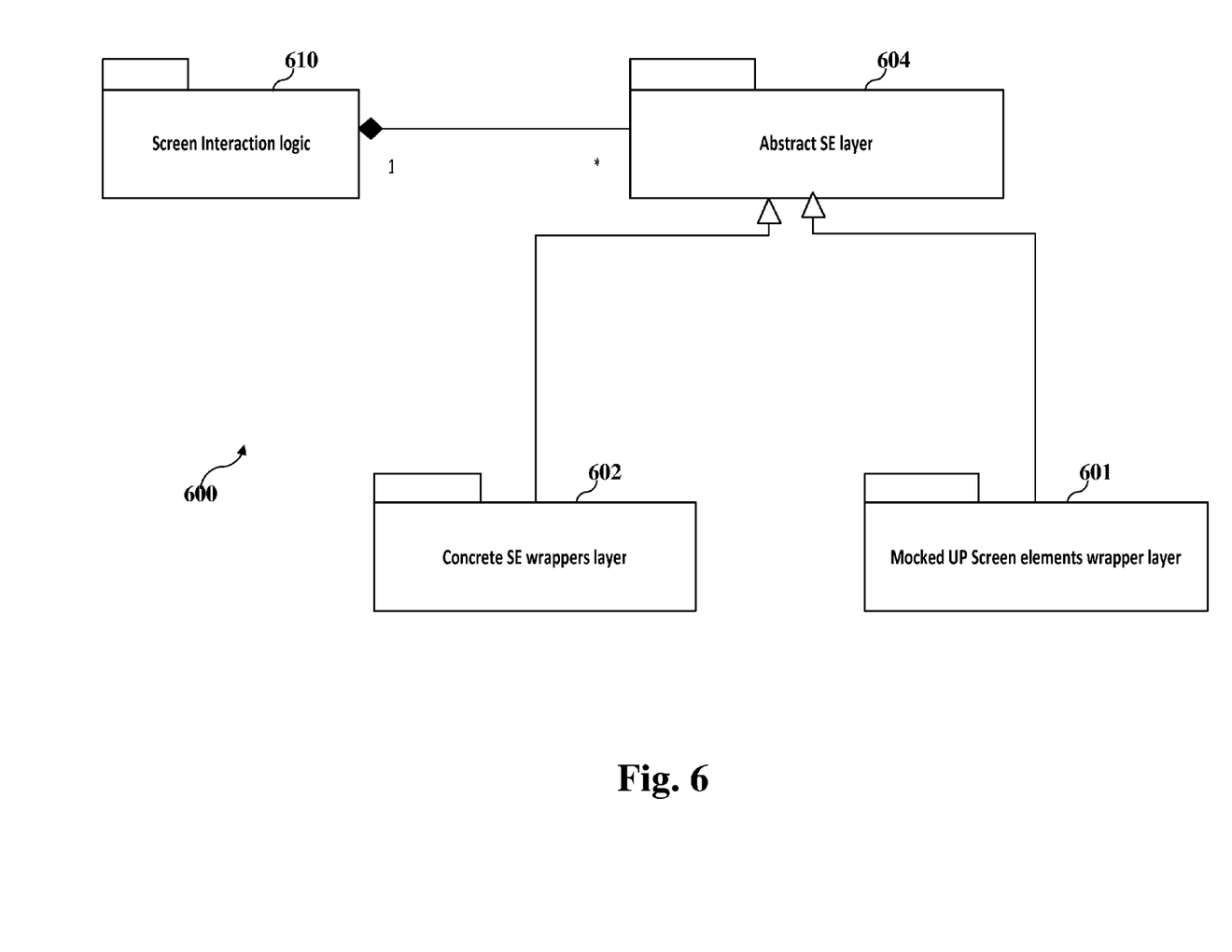
FIG. 6 schematically illustrates a system for executing screen interaction logic in a mock-up mode and/or a real mode according to an embodiment of the invention.

Reference is made to FIG. 6, which schematically illustrates a system 600 for executing screen interaction logic 610 in a mock-up mode and/or a real mode according to an embodiment of the invention. Screen interaction logic 610 (e.g., logic 152 of FIG. 1) may define automated logic for one or more target application(s) (e.g., target applications 150 of FIG. 1).

A concrete screen element wrapper layer 602 may be implemented by libraries (e.g., dll libraries configured in a .NET format) with screen elements proxies (e.g., screen element proxies 404 of FIG. 4) implementing the behavior and structure of screen element interfaces to communicate with the real screen element (e.g., real screen elements 402 of FIG. 4).

A mocked up screen element wrapper layer 601 may be implemented by libraries (e.g., dll libraries configured in a .NET format) with mock objects (e.g., mock-up screen elements 401 of FIG. 4) implementing the behavior and structure of screen element interfaces (e.g., interface 410 of FIG. 4), but without connecting to the real screen element, only by mocking its behavior. Mocking a behavior may include, for example, recording or notifying in a log or in some other way, actions performed by the mock object and capturing its data in the mocked object. For example, to mock or mimic the behavior of a "click" of a button (e.g., button 501 of FIG. 5), the real screen element may use the screen element proxy to click the real button, while the mock screen element may simply log or notify a record database (e.g., such as a table stored in interaction center 124 of FIG. 1) that a click is received and/or raise an event, but without actually clicking the real screen element button.

Screen interaction logic 610 may not be linked to proxies or the connectivity layer. Instead, all the automated logic of screen interaction logic 610 may be generated using interfaces (e.g., interface 410 of FIG. 4). An abstract screen element layer 604 may use screen interaction logic 610 with either concrete or mocked screen element wrapper layer 601, 602 to provide alternate modes of operation, for example, as follows:

"Real" mode: In this mode, screen interaction logic 610 interacts with the real screen elements, using concrete screen element wrapper layer 602 (e.g., the connectivity layer). In order to execute screen interaction logic 610 in this mode, the target application(s) may be installed in the same environment in which screen interaction logic 610 is installed and executed.

"Mocked" mode: In this mode, screen interaction logic 610 does not typically interact with real screen elements but with mocked screen elements. In this mode, the target application(s) may be installed in a different environment than that in which screen interaction logic 610 is installed and executed.

Depending on the mode, screen interaction logic 610 may be plugged into the screen element wrapper layer 601 or 602 that is associated with the current selected mode. The mode may be set and switched automatically or manually, by a user, for example, using the interface provided in FIG. 7.

Figure 7:
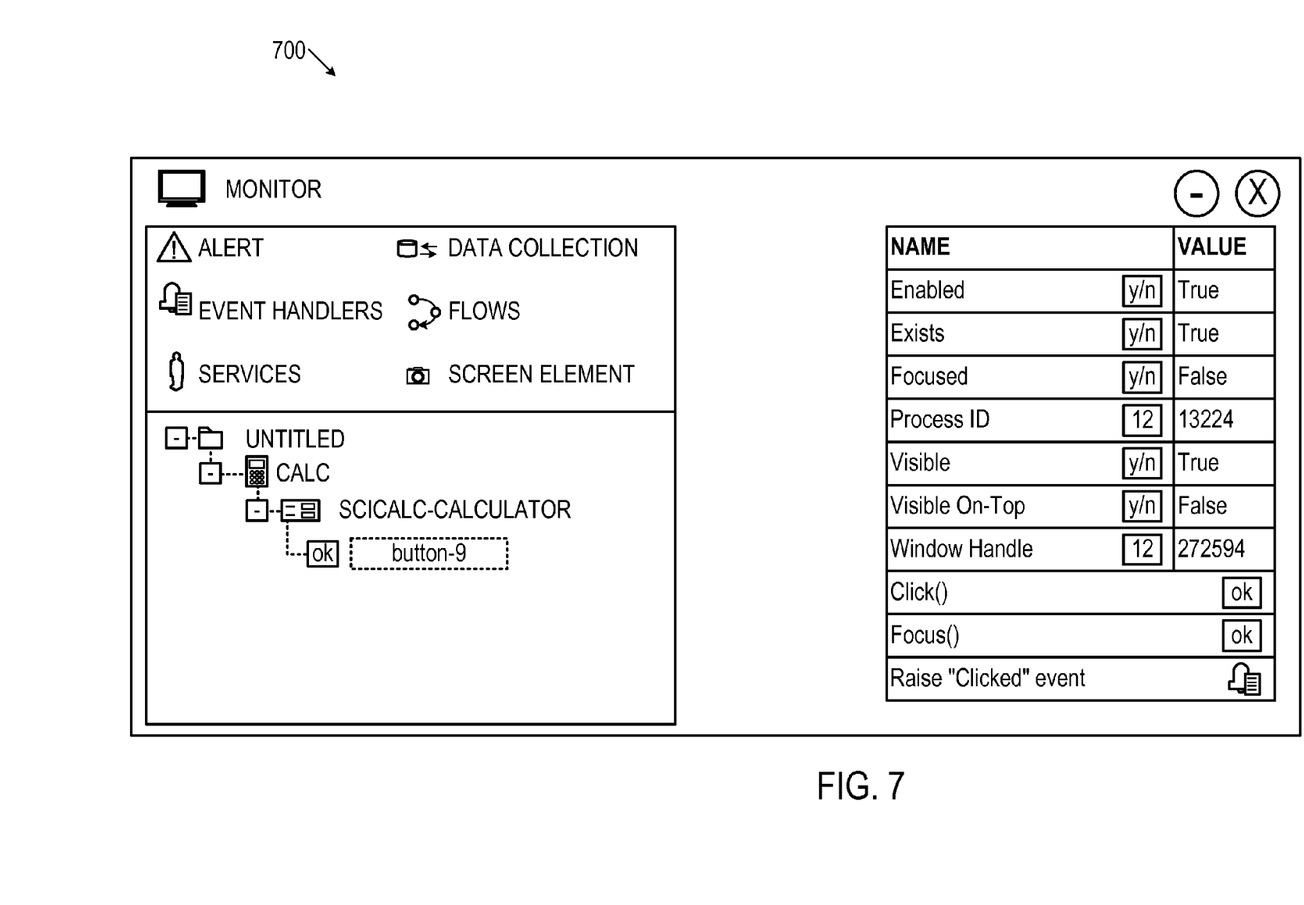
FIG. 7 schematically illustrates a user interface for setting the mode and parameters for interaction logic according to an embodiment of the invention.

Reference is made to FIG. 7, which schematically illustrates a user interface 700 for setting the mode and parameters of interaction logic (e.g., screen interaction logic 610 of FIG. 6) according to an embodiment of the invention. User interface 700 may be displayed on a monitor or screen, such as, output device 125 of FIG. 1.

In the example of FIG. 7, user interface 700 provides options for automating a calculator button, exposing its functionality and data, for example, enabled, exists, focused, process identification (ID), visible, visible on-top, window handle, click, focus, raise "clicked" event. Other screen elements, setting options and/or configuration interfaces may be used. For example, the "real" mode or the "mock" mode may be set in a configuration file of the application that executes the automation logic.

When working in mock-up mode, mock screen elements (e.g., mock-up screen elements 401 of FIG. 4) may not interact, have a data source, execute the associated real application methods and/or raise the events, as would the corresponding real screen elements (e.g., real screen element 402 of FIG. 4).

Accordingly, the desired data may be inserted, the application methods may be executed and/or the events may be raised, for example, manually or automatically. Since the automated logic (screen interaction logic 610 of FIG. 6) is built over interfaces (e.g., interface 410 of FIG. 4) and not using the real screen element, when the automated logic is plugged into the mocked screen element, the automated logic may interact with the data and behavior of the mocked screen element. For example, a solution engineer may generate automated logic based on a customer address text box of a CRM application, such that when the agent inserts data to the text box, the inserted data is replicated to other text boxes of other applications. Such an embodiment may automate a task, previously done manually by the agent copying the address and pasting it in the other applications, to optimize the agent's work product.

In order to test the behavior of the automated logic when working in mock-up mode, a processor (e.g., interaction center processor 142 of FIG. 1) may insert the appropriate data into the relevant property field (e.g., "address") of the mock screen element and raise the relevant event (e.g., text changed event of the property address), for example, manually or automatically. The logic may detect or "listen" for such events and may react to them, for example, by executing the logic. In response to such events (e.g., detecting a change in the text of the address property), the logic may be executed to trigger an associated automated event (e.g., the state of the screen element to change). The result of the automated event may be tested. In one example, the test result may be determined to be positive or satisfactory if the mock screen element of the application to which the address text should be pasted is indeed populated.

Mock-up mode may also enable the logic code to be tested in smaller pieces or with greater resolution. In some examples, the logic code may interact with screen elements which are instantiated or executed only in certain steps and usage of the target application. For example, a programmer may desire to create logic that interacts with a CRM application and more specifically with a "combo box" control in which the customer's marital status is inserted. However, the combo box may only be accessed after a series of steps in the target application. Managing these preceding steps may be time consuming for the solution engineer. However, in mock-up mode the user may test the behavior without any pre-requested steps, for example, only by changing the data of the target mock-up screen element or invoking one of the methods or events of its behavior. Programming only a sub-portion of the sequence of real screen elements integrated in the target application environment may provide efficient development. In some embodiments, to ease the work of the solution engineer in mock mode-up, an application may be provided to automatically debug and monitor the logic.

Once the automated logic is generated and tested, the solution may be switched from mock-up mode deployed in the local development environment to real mode deployed in the remote application environment.

Embodiments of the invention may enable a solution engineer to develop and test the behavior of logic locally that automates target applications installed remotely, for example, at less cost. Embodiments of the invention may enable a solution engineer to test its solution applied to any sub-unit (e.g., smaller pieces) of application code, for example, for more effective unit testing.

Figure 8:
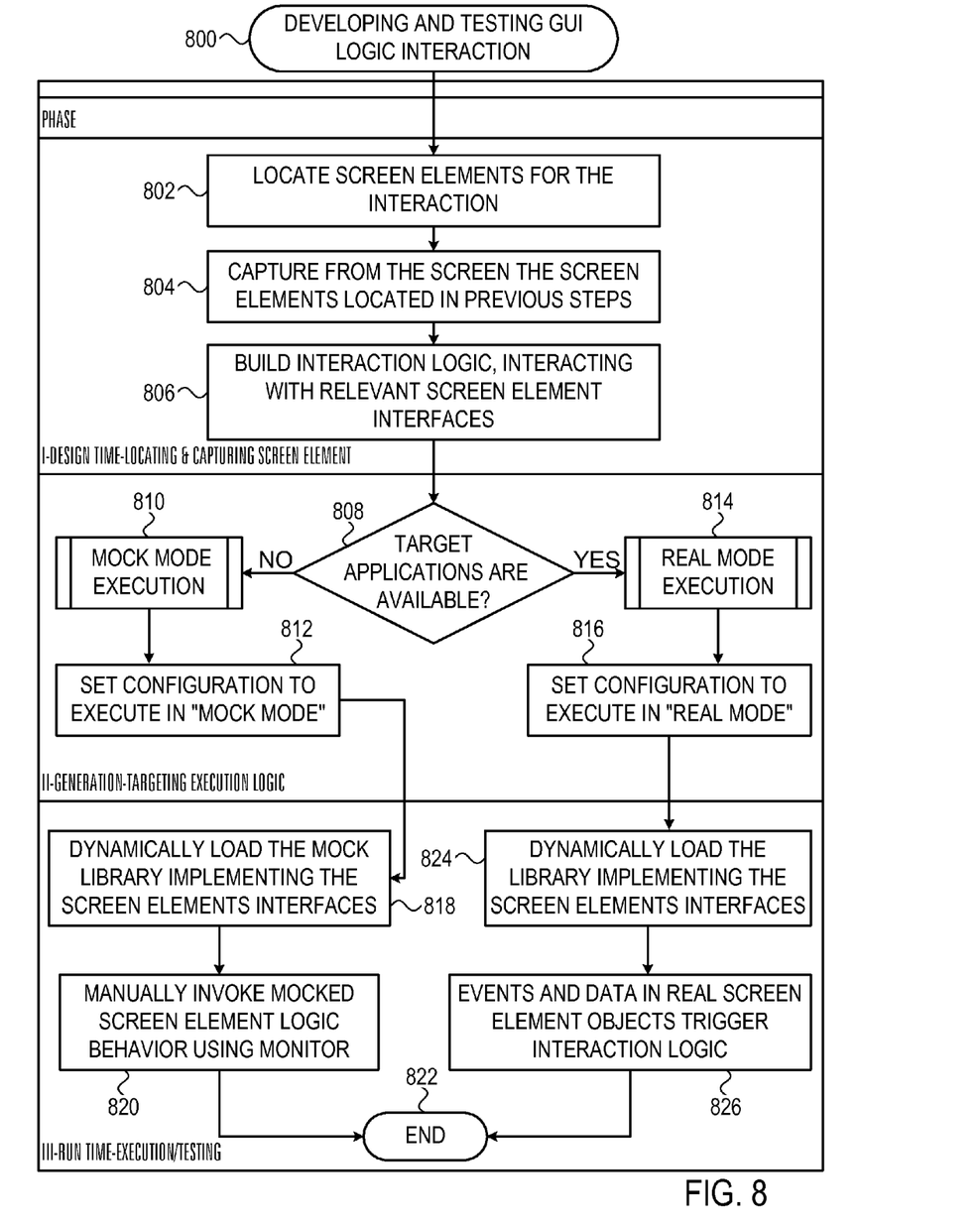
FIG. 8 is a flowchart of a method for designing, generating and testing interaction logic according to an embodiment of the invention.

Reference is made to FIG. 8, which is a flowchart 800 of a method for designing, generating and testing interaction logic according to an embodiment of the invention.

The method of flowchart 800 is separated into three stages or sub-processes (other stages, and other operations, may be used in other embodiments of the present invention):

a. Design Time—Operations 802-806 to locate and capture screen elements.

b. Generation Time—Operations 808-816 to target execution logic.

c. Run Time—Operations 818-826 to execute and test the interaction logic.

Design Time:

In operation 802, a processor may locate an interactive screen element in the application. The screen element may be selected manually by a developer or automatically according to predetermined rules. The processor may be a processor in a probe or capture device (e.g., processor 112 of FIG. 1), an agent device (e.g., processor 136 of FIG. 1), or an interaction center (e.g., processor 142 of FIG. 1).

In operation 804, a processor (e.g., processor 112 in capture server 110 of FIG. 1), may capture (e.g., copy and store) the screen element located in operation 802 from a screen (e.g., output device 125 of agent device 120 of FIG. 1).

In operation 806, a processor may program (e.g., create code, instructions, or software) interaction logic (e.g., interaction logic 610 of FIG. 6) to interact with relevant screen elements. The interaction logic may be programmed according to the specific design of the system. The following example of interaction logic and functionality is used throughout the description of FIG. 8, although any other logic and/or functionality may be used. In response to a customer's request to change an address in a first application, the interaction logic may automatically copy the changed address to a second application that is in use by an agent or customer service representative (CSR). The first application may be, for example, a CRM application and the second application may be, for example, an analytics application that calculates once a day which packages to offer to the customer according to several parameters, such as, location of residence. In this example, the following screen elements may be located in operation 802:

Address text box of the first (CRM) application.
Apply button of the first (CRM) application.
Address text box of the second (analytics) application.
Apply button of the second (analytics) application.

Interfaces (e.g., interfaces 410 and/or 510 of FIGS. 4 and 5) may be generated in operation 806 to represent these screen elements to interact with the interaction logic. In this example, the following interfaces may be generated:

Two interfaces abstracting the buttons of the first (CRM) and the second (analytics) applications.
Two interfaces abstracting the address text boxes of the first (CRM) and the second (analytics) applications.

While generating the interaction logic, the screen elements may be represented by virtual or abstract objects (e.g., interfaces 410 and/or 510 of FIGS. 4 and 5). The interaction logic may be generated upon these abstract objects.

In the example above, the interaction logic may be, for example, described as follows:

Detect a "click" event of the CRM button screen element interface.
Once clicked, read the textual value of the address text box in the first (CRM) application.
Set the textual value of the address text box in the second (analytics) application to be the same as the read values in the first (CRM) text box.
Enter a "click" event on the apply button of the second (analytics) application.

Although the interaction logic is designed using abstract screen elements (in the design time stage), the logic may be executed by concrete objects (in the generation time and run time stages). In may be unknown in the design time stage if the interaction logic is to be executed by real or mock-up concrete objects. Accordingly, the logic code may command a processor to load the concrete object according to the mode set in the generation time and/or run time stages, for example, as shown by the following pseudo code (other code or logic may also be used):

```
IScreenElement screenElement =
RetrieveConcreteObjectAccordingToExecutionMode (Type
ScreenElementType, ExecutionMode mode)
``` where the RetrieveConcreteObjectAccordingToExecutionMode command may cause a processor to load a relevant library and retrieve an instance of the concrete object according to the set mode (e.g., a mock library and mock object when the mock mode is set and a real library and real object when the real mode is set). For example, when the screen element is a button (e.g., button 502 of FIG. 5), the logic code may be represented, for example, by the following pseudo code (other code or logic may also be used):

```
IButton button =
RetrieveConcreteObjectAccordingToExecutionMode (Type
IButton, ExecutionMode mode)
```

Generation time: In this stage, the interaction logic generated in operation 806 may be executed and tested.

In operation 808, a processor may determine if the target (e.g., CRM and analytics) applications are available. If so, a process of processor may proceed to operations 814-816 to execute the logic in a real mode. Otherwise, a process of processor may proceed to operations 810-812 to execute the logic in a mock mode, for example, when the target applications are not available or to test logic abstracted from the target applications. Operations 808 may set the execution mode to real mode or mock mode (e.g., in an external configuration file).

In operation 810, the logic generated in operation 806 may be executed in mock mode, for example, using mock screen elements (e.g., mock-up screen elements 401 of FIG. 4), which may be generated in an environment (e.g., at interaction center 124 of FIG. 1) separate from the target applications environment(s) (e.g., at application servers 122 of FIG. 1). In this mode, the logic may be executed and tested disconnected from the physical layer that represent the real screen elements, for example, to test or develop the logic in environments in which the target applications are not available.

In operation 812, the application may be notified that the execution mode is a "mock" execution mode. Accordingly, at the run time stage, all instances in the logic code that refer to a screen element interface may be instantiated or executed with a screen element mock-up, by loading the relevant mock-up library.

In operation 814, the logic generated in operation 806 may be executed in real mode, for example, using real screen elements (e.g., real screen elements 402 of FIG. 4), which may be generated at the target applications environment(s) (e.g., at application servers 122 of FIG. 1). In the real mode, the logic reacts and interacts with real screen elements. In the example above, the real screen elements are elements of the CRM and analytics applications. To perform this interaction, real mode libraries may be pre-generated with objects that are able to connect to these applications. A screen element proxy (e.g., screen element proxy 404 of FIG. 4) may implement a pre-defined interface (e.g., interface 410 of FIG. 4).

In operation 816, the application may be notified that the execution mode is a "real" execution mode. Accordingly, at the run time stage, all instances in the logic code that refer to a screen element interface may be instantiated or executed with a real screen element, by loading the real pre-written library.

Run Time:

After the interaction logic is generated in operation 806, the logic may be executed in the desired mode. The screen element layer (e.g., abstract screen element layer 604 of FIG. 6) may connect to real screen element (in real mode) or mock-up screen element (in mock-up mode) by loading the respective libraries. The logic for these modes (e.g., configured as a mode-specific data library) may be plugged into the screen element layer according to the mode set in the generation time stage. The logic may be a file or a hardware or software module that is plugged or loaded into the screen element layer to run or add the functionality of the logic.

In operation 818, to execute the interaction logic in mock-up mode, a library may be loaded (e.g., by interaction center processor 142 of FIG. 1) in which mock screen element are implemented according to the mock mode notified in operation 812.

In operation 820, since the real screen element may not be accessible in mock-up mode, an application may expose the methods, events and properties of the mock screen element to execute and test the logic. In the example above, when the user clicks the "apply" button in the CRM application, the logic may copy the address from a text box in the CRM application to a text box in an analytics application and simulate the click on the "apply" button in the analytics application. In one embodiment, desired values (e.g., the new address of the customer) may be entered in a monitor application (e.g., as described in reference to FIG. 7) and the click method of the mocked object may be invoked. If the test is successful, the monitor application may show the textual value of the address text box of the analytics application is now populated with the textual value of the address text box of the CRM application and a mocked click may be performed (e.g., identified in a log file or by some visual representation). After the logic is successfully executed, the mock process may end in operation 822.

In operation 824, to execute the interaction logic in real mode, all instances in the logic code that refer to a screen element interface may be instantiated or executed with a screen element proxy object by loading the relevant library (e.g., using interaction center processor 142 of FIG. 1).

In operation 826, in real mode, since the logic may connect to the real screen elements, the target applications that provide these elements may be used to execute and test the logic. In the example above, the target applications are the CRM and the analytics applications. When the user clicks the "apply" button in the CRM application, the logic may copy the address from a text box in the CRM application to a text box in an analytics application and automate the click on the "apply" button in the analytics application.

In one embodiment, desired values (e.g., the new address of the customer) may be entered in a monitor application and the click method of the mocked object may be invoked. If the test is successful, the monitor application may show the textual value of the address text box of the analytics application is now populated with the textual value of the address text box of the CRM application and a mock-up click may be performed (e.g., identified in a log file or by some visual representation). The address text box may be entered and the "apply" button may be clicked in the CRM application. If the logic is successful, the textual value of the address text box of the analytics application may be populated with the textual value of the address text box of the CRM application and the "apply" button of the analytics application may be clicked. After the logic is successfully executed, the mock process may end in operation 822. If the logic is unsuccessful, a process or processor may return to operation 806 to adjust the logic.

Other operations or orders of operations may be used.

In some embodiments, a processor may program logic to automate target applications in a virtual environment using mock-up screen elements that mimic the behavior of real screen elements in the target applications environments. The programmed logic is adapted to be executed using the real screen elements in the target applications environments and may be executed by the same or different processor than the processor that programs the logic. For example, the processor that programs the logic may be an interaction center processor (e.g., processor 142 of FIG. 1), while the processor that executes the logic may be an agent workstation processor (e.g., processor 136 of FIG. 1).

It may be appreciated that although certain devices and functionality are assigned to "agents" or "customers" in a support center environment, such functionality may be implemented by any users in any environment. Users may include two or more live users, two or more automated user(s) or a combination of live user(s) and automated user(s).

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A method for generating interaction logic to automate a target application in a target applications environment, the method comprising:

locating and capturing real interactive screen elements in the target application;

programming interaction logic to interact with the real interactive screen elements;

testing the interaction logic in a mock-up mode by loading a mock-up data library to instantiate mock-up screen elements to mimic the behavior of the real interactive screen elements in the target applications environment, the testing being carried out in a virtual environment separate from the target applications environment and disconnected from the physical layer representing the real screen elements, wherein interactions with the mock-up screen elements are identified without executing the functionality of the interactions in the target applications environment; and executing in a computer system said programmed interaction logic using the real interactive screen elements, in a real mode, in the target applications environment.

2. The method of claim 1 comprising switching between said testing the interaction logic in the virtual environment in said mock-up mode and said executing the programmed interaction logic in the target applications environment in said real mode.

3. The method of claim 1, wherein the target application is installed in the target applications environment but not in the virtual environment.

4. The method of claim 1, wherein the entity that programs the logic is restricted from accessing to the target applications environment and uses the virtual environment to program the logic without such restriction.

5. The method of claim 1, wherein the virtual environment operates independently of the target applications environment at which the target applications are installed.

6. The method of claim 1, wherein the interaction logic is configured to be tested in smaller pieces of code in the virtual environment than in the target applications environment.

7. The method of claim 1, wherein the programming of the interaction logic interconnects events at screen elements in multiple different target applications within the same target applications environment, such that, a first interaction with a screen element in a first target application automatically triggers a second interaction with a screen element in a second different target application.

8. The method of claim 7, wherein the programming is such that text entered into a field of a graphical user interface (GUI) in the first target application automatically triggers at least some of the same text to be copied into a predetermined field of a GUI in the second target application.

9. The method of claim 1 comprising, prior to said testing, checking whether the target application is available, performing said testing if the target application is not available, and if the target application is available, loading a real data library to instantiate the real interactive screen elements in a real mode and performing said executing the programmed interaction logic using the real interaction screen elements in the target applications environment.

10. A system for generating interaction logic to automate a target application in a target applications environment, the system comprising:

a processor to:

locate and capture real interactive screen elements in the target application;

program interaction logic to interact with the real interactive screen elements;

test the interaction logic in a virtual environment using mock-up screen elements that mimic the behavior of the real interactive screen elements in the target applications environment, the virtual environment being disconnected from a physical layer representing the real interactive screen elements, wherein interactions with the mock-up screen elements are identified without executing the functionality of the interactions in the target applications environment; and a memory to store the interaction logic, wherein the programmed interaction logic is adapted to be executed using the real interactive screen elements, in a real mode, in the target applications environment.

11. The system of claim 10, wherein the operating environment switches between testing in the virtual environment in a mock-up mode and executing in the target applications environment in said real mode.

12. The system of claim 11, wherein the processor executes the mock-up mode by loading a mock-up data library to instantiate the mock-up screen elements and a processor executes the real mode by loading a real data library to instantiate the real interactive screen elements.

13. The system of claim 10 comprising a second processor to execute the programmed logic in the target applications environment.

14. The system of claim 10, wherein the target applications are installed in the target applications environment but not in the virtual environment.

15. The system of claim 10, wherein the processor is restricted from accessing to the target applications environment and uses the virtual environment to program the logic without such restriction.

16. The system of claim 10, wherein the processor operates the virtual environment independently of the target applications environment at which the target applications are installed.

17. The system of claim 10, wherein the processor tests the logic during programming, and wherein the logic is configured to be tested in smaller pieces of code in the virtual environment than in the target applications environment.

18. The system of claim 10, wherein the processor programs the interaction logic to interconnect events at screen elements in multiple different target applications within the same target applications environment, such that, a first interaction with a screen element in a first target application automatically triggers a second interaction with a screen element in a second different target application.

19. The system of claim 17, wherein each of the first and second target applications comprises a graphical user interface (GUI) having one or more fields, wherein text entered into a field of the GUI in the first target application is adapted to cause the programmed interaction logic to automatically copy at least some of the same text into a predetermined field of the GUI in the second target application.

20. The system of claim 18 comprising an agent workstation and a capture device in a support center environment, wherein the capture device automatically captures the first interaction from the agent workstation.

\* \* \* \* \*